Patented Mar. 9, 1926.

1,576,014

UNITED STATES PATENT OFFICE.

LAMBERT THORP, OF CINCINNATI, OHIO, ASSIGNOR TO THE LAMBERT THORP COMPANY, OF CINCINNATI, OHIO, A CORPORATION OF OHIO.

PROCESS OF MANUFACTURING BARBITURIC-ACID DERIVATIVES.

No Drawing.   Application filed March 20, 1925.   Serial No. 17,112.

*To all whom it may concern:*

Be it known that I, LAMBERT THORP, a citizen of the United States of America, residing in the city of Cincinnati, county of Hamilton, State of Ohio, U. S. A., have invented certain new and useful Improvements in Processes of Manufacturing Barbituric-Acid Derivatives, of which the following is a specification.

In the manufacture of 5-5 dialkyl derivatives of barbituric acid, several of which are used in medicine as sedatives, the last step in one of the syntheses is that of condensing a derivative of malonic ester with urea. These two substances unite by elimination of alcohol and a corresponding derivative of barbituric acid results.

A number of patents issued both in this and other countries describe this condensation and the method of carrying it out, the usual custom being to bring about the condensation by treating molecular proportions of the malonic ester and urea in absolute alcoholic solution with sodium ethylate, and always, so far as applicant is aware, specifying that the use of an autoclave and superatmospheric pressure and high temperatures are necessary. Moreover, chemists would deem the use of an autoclave to be customary and necessary in carrying out this, and similar reactions. This method results often in low yields, due to partial destruction of the charge by the high temperature and pressure, and is also troublesome and time-consuming on account of the necessity of the slow and careful heating of the equipment, care in controlling the temperature and pressure and in cooling the autoclave before it can be discharged.

I have now found that much of this trouble can be entirely eliminated and the use of an autoclave avoided by making the condensation at ordinary pressure in any suitable vessel, as follows, taking as a specific example the condensation of ethyl isopropyl malonic ester with urea:

In a 3 liter flask provided with reflux condenser, add absolute alcohol 900 cc., in which is now dissolved metallic sodium 69 gm. When solution is complete, cool to 35 to 40 degrees C. and add urea (powdered) 100 gm. Add a chip of porous plate and hang a white thread from the cork of the flask to the solution to help prevent superheating and bumping. This reaction superheats and bumps very violently and care should be exercised in carrying it out. Through the condenser is now added ethyl isopropyl malonic ester 250 gm. Turn the condenser down at an angle of 45 degrees and heat the flask in a calcium chloride bath of such a concentration that it boils at 115 degrees C. This should give an inside temperature of 107 degrees C. If not, the concentration of the calcium chloride bath should be varied so that an inside temperature of 107 degrees C. is obtained. Maximum yields of the best product are obtained at approximately 107 degrees C. If the temperature is right, distill off alcohol until about 860 cc. have been collected. Some ammonia will come over with the alcohol. A solid mass of the sodium salt is left in the flask. Add water to dissolve it and filter if a clear solution is not obtained. Add hydrochloric acid until the mass is acid to Congo paper. Filter, press out and resludge in water, and filter again so that the filtrates are free from mineral acid. The product is then recrystallized from hot water. Melting point of ethyl isopropyl barbituric acid—197 degrees C. uncorrected—200 to 201 degrees C. corrected for stem exposure.

By this method, high yields of a superior product are obtained with practically no loss due to decomposition, and the operation may be carried out at maximum speed in simple equipment. Furthermore, there is no loss of time due to the necessity of controlling accurately pressures, as is required in the autoclave process. The method works on many other derivatives of malonic ester than that of the specific example given and the process seems to be of general application.

It is to be emphasized that in carrying out this invention, one of the major considerations is that for maximum results the temperature of the reaction mass must be accurately controlled for the manufacture of each derivative and that there is apparently a temperature best suited for the manufacture of each derivative, and in the specific example given, the temperature seems to be close to, if not exactly, 107 degrees C. at atmospheric pressure.

Owing to the fact that with other derivatives of malonic ester than the ethyl isopropyl compound, different temperatures than that shown in the specific example may be required for the broad application of this invention, I do not restrict myself to the temperature specified for the condensation, neither do I restrict myself to the exact volumes or proportionate weights of ingredients, since it may be necessary to vary these to get maximum results in specific instances.

Having described my invention, what I claim is:

1. The process of manufacturing barbituric acid derivatives by condensing malonic esters with urea in absolute alcoholic solution by means of metallic sodium by distilling the alcohol out of the mass without preliminary refluxing.

2. The process of manufacturing barbituric acid derivatives by condensing malonic esters with urea in absolute alcoholic solution by means of metallic sodium at atmospheric pressure by distilling the alcohol out of the mass without preliminary refluxing.

3. The process of manufacturing barbituric acid derivatives by condensing malonic esters with urea in absolute alcoholic solution by means of sodium ethylate at a temperature of approximately 107° C. by distilling the alcohol out of the mass without preliminary refluxing.

4. The process of manufacturing ethyl isopropyl barbituric acid by condensing ethyl isopropyl malonic ester with urea in absolute alcoholic solution by means of sodium ethylate at atmospheric pressure and at a temperature of approximately 107° C. by distilling the alcohol rapidly from the mass without preliminary refluxing.

5. The process of manufacturing ethyl isopropyl barbituric acid by condensing ethyl isopropyl malonic ester with urea in absolute alcoholic solution without establishing high pressure, such as would obtain in an autoclave without preliminary refluxing.

6. The process of manufacturing ethyl isopropyl barbituric acid by condensing ethyl isopropyl malonic ester with urea in absolute alcoholic solution at approximately atmospheric pressure without preliminary refluxing.

7. The process of manufacturing ethyl isopropyl barbituric acid by condensing ethyl isopropyl malonic ester with urea in absolute alcoholic solution by means of sodium ethylate as a condensing agent, the operation being carried out at atmospheric pressure without preliminary refluxing.

8. The process of manufacturing ethyl isopropyl barbituric acid by condensing ethyl isopropyl malonic ester with urea in absolute alcoholic solution by means of sodium ethylate as a condensing agent, the operation being carried out at a pressure sufficiently low to render the use of an autoclave unnecessary without preliminary refluxing.

9. The process of manufacturing ethyl isopropyl barbituric acid by condensing ethyl isopropyl malonic ester with urea at atmospheric pressure at a temperature of approximately 107 degrees C. without preliminary refluxing.

This specification signed this 16th day of March, 1925.

LAMBERT THORP.